United States Patent
Long et al.

(10) Patent No.: US 8,558,685 B2
(45) Date of Patent: *Oct. 15, 2013

(54) REMOTE DISPLAY TAMPER DETECTION USING DATA INTEGRITY OPERATIONS

(75) Inventors: Joseph D. Long, Oak Ridge, NC (US); Giovanni Carapelli, Florence (IT)

(73) Assignee: Gilbarco Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/220,183

(22) Filed: Aug. 29, 2011

(65) Prior Publication Data

US 2011/0314552 A1    Dec. 22, 2011

Related U.S. Application Data

(63) Continuation of application No. 11/562,150, filed on Nov. 21, 2006, now Pat. No. 8,009,032.

(51) Int. Cl.
*G08B 23/00* (2006.01)

(52) U.S. Cl.
USPC ............................................. 340/500; 705/16

(58) Field of Classification Search
USPC .................. 340/500, 539.1, 539.31, 5.1, 5.9; 705/16–18
See application file for complete search history.

(56) References Cited

U.S. PATENT DOCUMENTS

| | | | |
|---|---|---|---|
| 4,200,770 A | 4/1980 | Hellman et al. | |
| 4,405,829 A | 9/1983 | Rivest et al. | |
| 4,797,920 A | 1/1989 | Stein | |
| 5,228,084 A | 7/1993 | Johnson et al. | |
| 5,485,370 A * | 1/1996 | Moss et al. | 709/217 |
| 5,493,613 A | 2/1996 | Denno et al. | |
| 5,790,410 A | 8/1998 | Warn et al. | |
| 5,832,206 A | 11/1998 | De Jesus et al. | |
| 6,026,492 A * | 2/2000 | Cromer et al. | 726/35 |
| 6,115,819 A | 9/2000 | Anderson | |
| 6,185,307 B1 | 2/2001 | Johnson, Jr. | |
| 6,360,138 B1 | 3/2002 | Coppola et al. | |
| 6,442,448 B1 | 8/2002 | Finley et al. | |

(Continued)

FOREIGN PATENT DOCUMENTS

WO    2006034713    4/2006

OTHER PUBLICATIONS

Portions of the prosecution history of copending New Zealand patent application No. 565433.

(Continued)

*Primary Examiner* — George Bugg
*Assistant Examiner* — Edny Labbees
(74) *Attorney, Agent, or Firm* — Nelson Mullins Riley & Scarborough, LLP (57) ABSTRACT

Methods and systems for detecting tampering of a remote display. According to one method, a first data integrity result is generated by performing a first data integrity operation on display data to be displayed on the remote display at a secure module. The display data is transmitted from the secure module to the remote display security module. The remote display security module receives the display data. A second data integrity result is generated by performing the first data integrity operation on the display data received at the remote display security module. A determination is made as to whether the remote display has been tampered with at the secure module if the first data integrity result does not match the second data integrity result.

23 Claims, 7 Drawing Sheets

(56) References Cited

U.S. PATENT DOCUMENTS

| | | |
|---|---|---|
| 6,577,734 B1 | 6/2003 | Etzel et al. |
| 6,736,313 B1 | 5/2004 | Dickson |
| 6,789,733 B2 | 9/2004 | Terranova et al. |
| 7,047,223 B2 | 5/2006 | Watlington |
| 7,054,200 B2 | 5/2006 | Hanzawa et al. |
| 7,054,829 B2 * | 5/2006 | Campo et al. .................... 705/12 |
| 7,099,479 B1 * | 8/2006 | Ishibashi et al. .............. 380/281 |
| 7,215,775 B2 * | 5/2007 | Noguchi et al. .............. 380/249 |
| 7,334,216 B2 * | 2/2008 | Molina-Moreno et al. ... 717/109 |
| 7,370,200 B2 * | 5/2008 | Kindberg et al. ............. 713/168 |
| 7,589,735 B2 * | 9/2009 | Hedrick et al. ............... 345/501 |
| 2002/0026575 A1 | 2/2002 | Wheeler et al. |
| 2002/0066020 A1 | 5/2002 | Whytock |
| 2002/0124170 A1 | 9/2002 | Johnson, Jr. |
| 2002/0138554 A1 * | 9/2002 | Feigen et al. ................. 709/203 |
| 2002/0153424 A1 | 10/2002 | Li |
| 2002/0157003 A1 | 10/2002 | Beletski |
| 2002/0191029 A1 | 12/2002 | Gillespie et al. |
| 2003/0002667 A1 | 1/2003 | Gougeon et al. |
| 2003/0030720 A1 | 2/2003 | Hutchings |
| 2003/0055738 A1 | 3/2003 | Alie |
| 2003/0194071 A1 | 10/2003 | Ramian |
| 2003/0233555 A1 | 12/2003 | Shusteri |
| 2004/0172339 A1 | 9/2004 | Snelgrove et al. |
| 2005/0278533 A1 | 12/2005 | Mayer |
| 2006/0089145 A1 * | 4/2006 | Chen et al. .................... 455/445 |

OTHER PUBLICATIONS

Portions of the prosecution history of copending European patent application No. 06787794.4.

Examination report cited in copending New Zealand patent application No. 565433, dated Sep. 24, 2009.

PCT International Search Report (dated Mar. 15, 2007) and PCT International Preliminary Report on Patentability (dated Feb. 5, 2008) issued for PCT application No. PCT/US2006/027952 filed on Jul. 19, 2006.

Gilbarco: SmartConnect, from http://www.gilbarco.com/ind_product.cfm?ContentItemID=185.

"Smart Connect" Product Brochure by Gilbarco Veeder-Root, copyright 2004 Gilbarco Inc.

Portions of the prosecution history of copending U.S. Appl. No. 11/197,220, filed Apr. 8, 2005.

Chapter 7 of Book 4 of Version 4.1 of the Europay MasterCard Visa ("EMV") standard for Integrated Circuit Card Specifications for Payment Systems (May 2004).

PCT International Search Report and Written Opinion dated May 15, 2008, issued for PCT patent application No. PCT/US2007/023410 filed on Nov. 7, 2007.

"Payment Card Industry ("PCI") PIN Entry Device Testing and Approval Program Guide," Version 4.0, VISA Public, Sep. 2004.

"TFT Color LCD Module: Type: NL6448CC33-30W 26cm (10.4 Type), VGA, Specifications" 4th ed., NEC Corporation, Jul. 13, 2000.

"Payment Card Industry (PCI): POS PIN Entry Device Security Requirements Manual," Version 1.2, Sep. 2004.

"PCI POS PED Evaluation FAQ (Technical)," Sep. 21, 2004.

Supplementary European Search Report issued on Dec. 2, 2011 for European patent application No. 07867377.

Translation of Second Office Action from corresponding Chinese application No. 200780050185.5 mailed Nov. 5, 2012.

* cited by examiner

REMOTE DISPLAY TAMPER DETECTION USING DATA INTEGRITY OPERATIONS

CROSS REFERENCE TO RELATED APPLICATIONS

This patent application is a continuation of U.S. patent application Ser. No. 11/562,150, filed on Nov. 21, 2006, now U.S. Pat. No. 8,009,032 and entitled "Remote Display Tamper Detection Using Data Integrity Operations," the entire disclosure of which is hereby incorporated by reference as if set forth verbatim herein and relied upon for all purposes.

FIELD OF THE INVENTION

The present invention relates to a system and method for tamper detection of a remote display using data integrity operations.

BACKGROUND OF THE INVENTION

Fuel dispensers dispense petroleum and alternative fuel products at retail service stations and convenience store operations around the world. Fuel dispensers have user interfaces, including displays and keypads, for effecting customer payment transactions. These user interfaces include credit/debit card magnetic readers for retrieving account information from the customer. Other point of sale (POS) terminals also include similar user interfaces.

These user interfaces, and in particular fuel dispenser interfaces accessible outside to the public, have become subject to attack by individuals desiring to acquire account information from customers. Display interfaces may be hacked to present false prompts to customers on the user interface in order to acquire this account information. When customers respond to these false prompts, their account information may be commandeered and used improperly and fraudulently.

This potential for tampering has resulted in certain physical security measures being adopted for fuel dispenser user interfaces. These physical security measures include mounting the display within a secure enclosure with the display controller. Alternatively, the display has been mounted to a secure enclosure and the display controller has been placed within the secure enclosure. In either case, the data and control lines for the display are not exposed and cannot be as easily hacked. However, these physical security measures have imposed undesirable physical limitations on mounting locations for these displays. As well, the display cannot be located remotely from the display controller with these solutions because the ribbon cable that connects the display controller to the display would be exposed. The exposed ribbon cable can be easily mounted with a hacking device to display false prompts to a customer.

Credit card processing companies have recognized and responded to the problem associated with user interfaces at point of sale (POS) systems, such as fuel dispensers, by generating new standards for security at these user interfaces. Applicant hereby incorporates by reference the document "Payment Card Industry (PCI): POS PIN Entry Device Derived Test Requirements," Version 1.2, dated September, 2004, as if fully set forth herein. These new standards require POS systems to ensure that data sent to the display is not intercepted and replaced with other data. Mechanisms for ensuring the authenticity and proper use of any prompts that are displayed to users of POS systems must be implemented and modification or improper use of the prompts must be prevented. Further, capabilities must be provided for detecting that the display has not been tampered with or removed from its original mounting location. The secure enclosure must be tamper proof and must include tamper detection circuitry. The display data cable that attaches to the display must be protected at the display interface.

Accordingly, an approach for remotely mounting a display and for providing tamper and removal detection for the display while meeting the new secure processing requirements is needed.

SUMMARY OF THE INVENTION

The present invention provides tamper detection for a remote display using data integrity operations. A display is attached to a remote secure module and mounted remotely from a display controller. The display controller is enclosed within a secure enclosure. Data to be displayed is processed at the display controller using a data integrity operation, such as a cyclical redundancy check (CRC), to produce a result. The display data is sent to the remote secure module attached to the display. The remote secure module performs the same data integrity operation and returns the result of its data integrity operation to the display controller. The display controller compares the received remote display module's CRC result with the CRC result it generated on the same display data. If the two results do not match, a determination is made that the display has been tampered with or removed. In this manner, fraud associated with the remote display may be detected by the display controller.

In the event of any damage to or physical separation of either the remote secure module attached to the display or the display itself, the remote secure module will cease transmitting data integrity results back to the display controller. Accordingly, the display controller will be able to detect whether someone has tampered with the display.

In alternative embodiments, security can be increased by use of multiple data integrity algorithms. Additionally, the selected data bits within a stream of display data upon which the algorithm is performed may be alternated to randomize the process. As well, certain data bits can be time delayed with respect to the algorithm so that they impact the data integrity result out of time sequence. The remote secure module may be instructed with respect to which algorithm to use, which data bits to use, and which bits to delay by transmitting an algorithm selection indication to the remote secure module periodically or with the display data. The algorithm selection may further be communicated to the display as a series of flags or bytes of control or display data in association with signals, such as a vertical sync, a horizontal sync, or a display reset.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
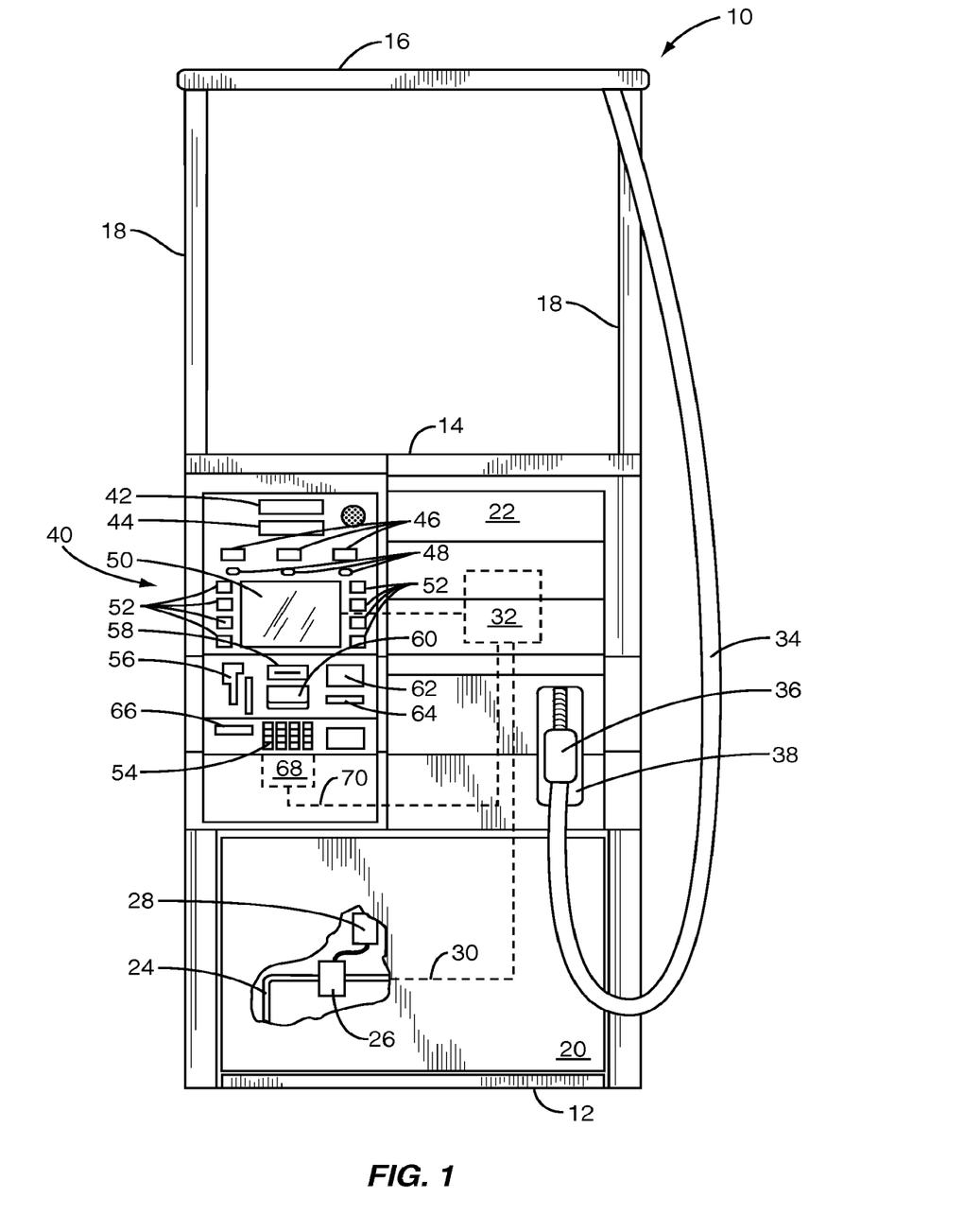
FIG. 1 illustrates an exemplary embodiment of a fuel dispenser 10 capable of providing display data integrity for a remote-mounted display.

Some basic information about a fuel dispenser 10 is described below before the particular aspects of the present invention are described. FIG. 1 illustrates an exemplary embodiment of the fuel dispenser 10 capable of providing display data integrity in a remote-mounted display. The fuel dispenser 10 has a base 12 and a top 14, with a canopy 16 supported by two side panels 18.

The fuel dispenser 10 is subdivided into multiple compartments. A hydraulic area 20 is used to enclose hydraulic components and an electronic area 22 is used to enclose electronic components. A vapor barrier (not shown) may be used to separate the hydraulic area 20 from the electronic area 22.

Several components used to control fuel flow may be housed within the hydraulic area 20. Fuel from underground storage tanks (USTs—not shown) is pumped through a piping network into inlet or fuel dispensing pipes. An inlet pipe 24 provides a piping network from an UST.

When fuel is dispensed, fuel begins to travel through a meter 26, which is responsive to flow rate or volume. A pulser 28 is employed to generate a signal in response to fuel movement through the meter 26. A data line 30 provides a signaling path from the pulser 28 to a secure module 32. The data line 30 provides signals to the secure module 32 indicative of the flow rate or volume of fuel being dispensed within the meter 26. The secure module 32 includes a controller and control circuitry for transaction-level and functional processing within the fuel dispenser 10. In addition to transaction-level and functional processing within the fuel dispenser 10, the secure module 32 provides security measures that will be described in more detail in association with FIG. 2 following the present high-level description of fuel dispenser 10 within FIG. 1.

Continuing with the description of FIG. 1, as fuel is dispensed from the fuel dispenser 10, the secure module 32 receives signaling from the pulser 28 associated with the meter 26 described above during the dispensing transaction. In response to receipt of signaling from the pulser 28, the secure module 32 provides transaction-level functionality within fuel dispenser 10. The secure module 32 collects, either directly or indirectly, meter flow measurements associated with the meter 26.

As a dispensing transaction progresses, fuel is then delivered to a hose 34 and through a nozzle 36 into the customer's vehicle (not shown). Fuel dispenser 10 includes a nozzle boot 38, which may be used to hold and retain the nozzle 36 when not in use. The nozzle boot 38 may include a mechanical or electronic switch (not shown) to indicate when the nozzle 36 has been removed for a fuel dispensing request and when the nozzle 36 has been replaced, signifying the end of a fueling transaction. A control line (not shown) provides a signaling path from the electronic switch to the secure module 32. The secure module 32 uses signaling received via the control line in order to make a determination as to when a transaction has been initiated or completed.

The fuel dispenser 10 also includes a user interface 40 to allow a user/customer to interact with and control a dispenser transaction at fuel dispenser 10. The user interface 40 includes a variety of input and output devices. The user interface 40 includes a transaction price total display 42 that may be used to present the customer with the price to be charged to the customer for fuel. The user interface 40 also includes a transaction gallon total display 44 that may be used to present the customer with the measurement of fuel dispensed in units of gallons or liters as a volume of fuel dispensed from the fuel dispenser 10.

The fuel dispenser 10 illustrated in the example of FIG. 1 is a multi-product dispenser that is capable of dispensing different grades of fuel. The price-per-unit (PPU) for each grade of fuel is displayed on displays 46. Octane selection buttons 48 are provided for the customer to select which grade of fuel is to be dispensed before dispensing is initiated.

The user interface 40 also includes a display 50 that can be used to provide instructions, prompts, and/or advertising or other information to the customer. Customer selections may be made in response to prompts on the display 50 by use of soft keys 52 or keys on a keypad interface 54. The soft keys 52 may be designed to align proximate prompts for the customer to indicate his or her desired choice in response to a question or request. The fuel dispenser 10 may also include a card reader 56 that is adapted to receive a magnetic stripe card, such as a credit or debit card, for payment of fuel dispensed. The fuel dispenser 10 may also include other payment or transactional type devices to receive payment information for transaction processing associated with transactions such as a pre-paid dispenser transaction, including a bill acceptor 58, an optical reader 60, a smart card reader 62, and a biometric reader 64. The fuel dispenser 10 includes a receipt printer 66 so that a receipt with a recording of the dispensing transaction carried out at fuel dispenser 10 may be generated and presented to the customer.

As previously described, the secure module 32 may be used to collect metering measurements from pulsers associated with meters within the fuel dispenser 10. The secure module 32 also controls the user interface 40 during fuel dispensing transactions, such as providing instructions, prompts, etc. to the customer before, during, and after a fueling transaction.

The secure module 32 further communicates with a remote display security module 68 via a control/data line interface 70. The remote display security module 68 includes a controller and control circuitry, as will be described in more detail below, for providing display data integrity and tamper detection for the display 50 that is part of the user interface 40. The control/data line interface 70 may include data and control lines for the display and may also include feedback lines for signaling between the secure module 32 and the remote display security module 68 over the control/data line interface 70.

By providing the secure module 32 and the remote display security module 68, the fuel dispenser 10 can provide tamper and removal detection for the display 50 and can satisfy the new standards for security imposed by credit card companies. As will be described in more detail below, data that is sent to the display 50 from the secure module 32 can be associated with a data integrity operation and that operation can be repeated at the remote display security module 68 to verify that the data has not been tampered with during transmission. Additionally, the remote display security module 68 can determine whether the display has been tampered with or removed and can convey that information to the secure module 32 to satisfy the new standards for security.

Figure 2:
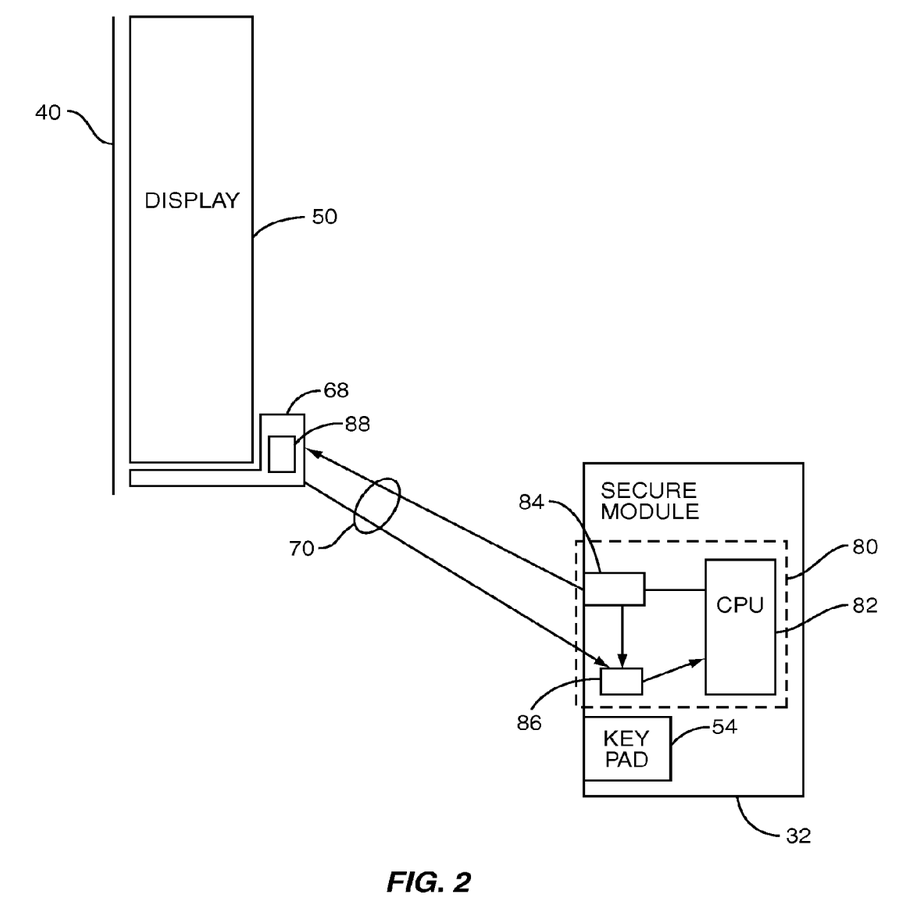
FIG. 2 is a block diagram of an exemplary security subsystem that provides remote display tamper detection using data integrity operations for data transmitted for display on a remote-mounted display.

FIG. 2 illustrates a block diagram of an exemplary security subsystem that provides remote display tamper detection using data integrity operations for data transmitted for display on a remote-mounted display, such as display 50. The user interface 40 is illustrated, including the display 50 remotely mounted and fixedly attached to the remote display security module 68. The display 50 may be attached to the remote display security module 68 by any means sufficient to form a tamper-proof data interface between the display 50 and the remote display security module 68.

The secure module 32 includes a secure display controller 80 that communicates over the control/data line interface 70 with the remote display security module 68. The bi-directional nature of the control/data line interface 70 is illustrated with directional arrows representing the direction of control and data signals for the control/data line interface 70. The secure display controller 80 includes a central processing unit (CPU) 82, a transmit data integrity module 84, and a receive data integrity module 86.

The transmit data integrity module 84 performs a transmit data integrity operation on data that is transmitted to be displayed on the display 50. The transmit data integrity operation may include a cyclical redundancy check (CRC) or any other mechanism that can be used for verification of the transmitted data. For example, a data integrity operation may include a mathematical or code based operation, algorithm, and/or acknowledgement that is performed either on the data transmitted or in response that can be repeated between the sender and receiver to ensure that the data transmitted and received are the same. By performing a data integrity operation on data to be displayed, the data can be verified upon receipt at the receive data integrity module 86, as will be described in more detail below, to allow verification that the data has not been tampered with during transmission. Additionally, encryption technologies may be used to further enhance security.

When data is ready to be transmitted for display on the display 50, the transmit data integrity module 84 performs a selected transmit data integrity operation on the data to be displayed. The transmit data integrity module 84 then sends the data to the remote display security module 68, where the remote display security module 68 can calculate its own data integrity result on the same display data and return the result back to the receive data integrity module 86 for comparison.

The selected transmit data integrity operation may be changed from time to time to improve security. For example, a CRC calculation may be performed on different portions of the display data or a shift register may be used to delay certain bits within the CRC calculation. Additionally, multiple algorithms may be performed on the same or on different portions of the display data. Other variations in the algorithm to be used are possible and all are considered within the scope of the subject matter described herein.

Further, a field within the transmitted data may be used to identify the algorithm or algorithms used for the transmit data integrity operation so that the data may be verified using the same algorithm or algorithms. The algorithm or algorithms identified may include an indication of which portion or portions of the display data are to be operated upon and any other specific operations to be performed on the data, as described above.

The change in the algorithm may occur randomly or may be periodic. For example, a vertical or horizontal sync signal or a reset signal for the display 50 may be used to indicate that the next data transmitted includes an algorithm selection. This algorithm selection may be further included in a separate data stream that itself may be encrypted or verified using a specific or varying integrity check to further increase security. A detailed example of one embodiment of the invention is described below in association with FIGS. 6 and 7.

The remote display security module 68 receives data to be displayed from the secure module 32. The remote display security module 68 includes a remote data integrity module 88 that receives the transmitted data. As will be described in more detail below, the remote data integrity module 88 generates its own data integrity result and sends it to the secure module 32. The secure module 32 then compares the result generated by the remote data integrity module 88 with the one it generated prior to sending the data to the remote display security module 68. A mismatch between the two results can provide an indication of fraud in association with the remote display.

The remote data integrity module 88 may include a CPU or hardware capable of detecting whether the display 50 has been tampered with or removed from the remote display security module 68. In order to detect tampering with or removal of the display 50 from the remote display security module 68, the remote display security module 68 includes tamper detection circuitry and switches (not shown). The tamper detection circuitry may include circuitry that is coupled to or that is a part of the remote data integrity module 88 that detects signals from tamper detection switches and that processes those signals to determine whether the display 50 has been tampered with or removed. Further, the switches may be triggered during a reset or power-down condition and may remain active and be sensed during or in association with a boot sequence after the reset or power-down condition is removed to prevent tampering with or removal of the display during these conditions. The switches may be associated with battery-powered circuitry, for example, or may otherwise provide an appropriate indication that is capable of being sensed in association with the boot sequence after the reset or power-down condition is removed. The tamper detection switches may include plunger switches, proximity switches, or any other type of mechanism that is capable of detecting tampering with or removal of the display 50 from its mounting location or from the remote display security module 68.

The remote data integrity module 88 performs the selected data integrity operation on the received data and transmits the result of the data integrity operation to the secure module 32 via the control/data line interface 70 as a received data integrity code. In the event of tamper detection, the remote data integrity module 88 will cease transmitting a received data integrity code to the secure module 32. In this way, the secure module 32 will be able to determine that the remote display was removed or tampered with, as will be described in more detail below.

After receipt of the received data integrity code from the remote display security module 68, the receive data integrity module 86 of the secure module 32 compares the received data integrity code with the transmit data integrity code. If the two codes match, the receive data integrity module 86 can notify the CPU 82 that the data was properly received at the remote display security module 68. If there is not a match, the receive data integrity module 86 can alert the CPU 82 that the data was not properly received at the remote display security module 68. In this way, data integrity for the display 50 can be provided.

Additionally, because the remote display security module 68 includes tamper and removal detection circuitry and the remote data integrity module 88 ceases transmission of a received data integrity code upon detection of tampering or removal of the display 50, the secure module 32 can determine that the display 50 was either tampered with or removed based upon the absence of receipt of a received data integrity code from the remote data integrity module 88. For example, when the tamper and removal detection circuitry of the remote display security module 68 detects an event that indicates that someone has either tampered with or removed the display 50, the remote data integrity module 88 ceases sending the receive data integrity code back to the secure module 32. Alternatively, the remote data integrity module 88 could send a separate error code to the secure module 32 to indicate the actual event that has occurred. In either case, the secure module 32 can detect that a problem with the remote display data integrity has occurred. Additionally, problems with the integrity of the control/data line interface 70 can also be detected.

It should be noted that, while the secure module 32 is illustrated with the keypad interface 54 included as part of the secure module 32, this representation is for ease of illustration purposes and is not to be considered limiting.

Figure 3:
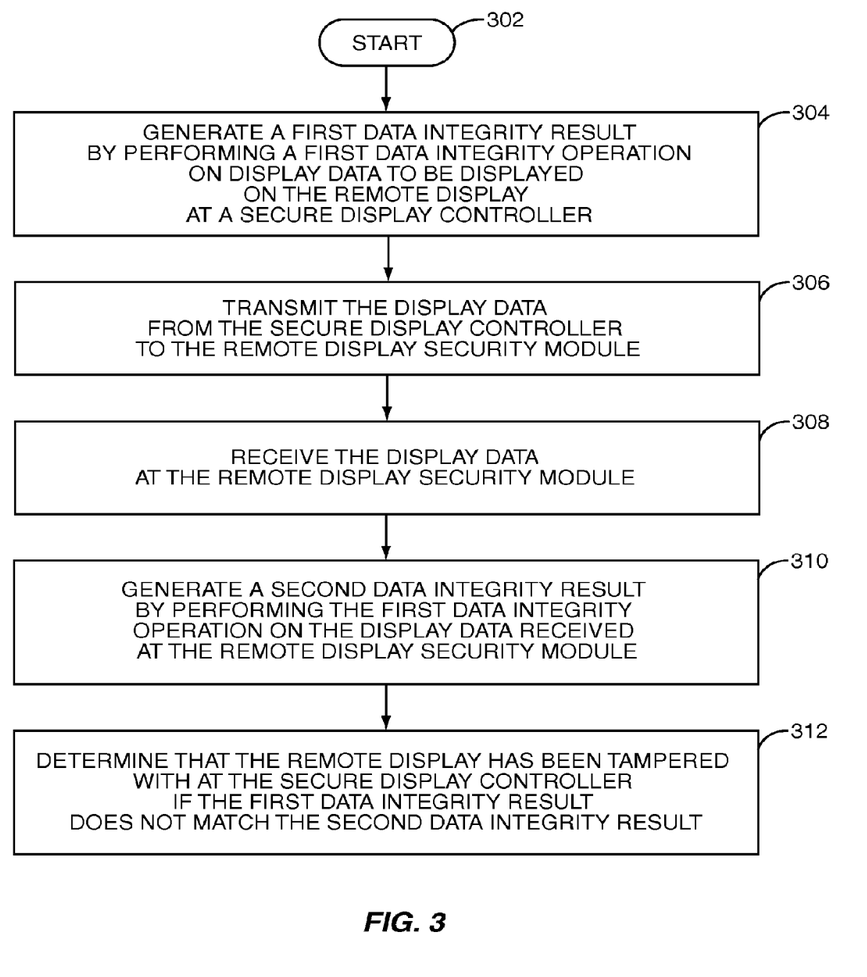
FIG. 3 is a flow chart illustrating exemplary steps for providing display data integrity for a remote-mounted display.

FIG. 3 illustrates an exemplary process for providing display data integrity for a remote-mounted display, such as the display 50. The process starts at step 302. The process generates a first data integrity result by performing a first data integrity operation on display data to be displayed on the remote display at a secure display controller (step 304). For example, the secure display controller 80 can calculate a CRC code by executing a CRC algorithm on data to be transmitted for display on the display 50. Further, as described above, the algorithm that is used may be changed occasionally to improve security and an indication of the selected algorithm can be included in association with the display data to be transmitted from the secure display controller 80 to the display 50.

The display data is transmitted from the secure display controller to the remote display security module (step 306). For example, the secure display controller 80 can transmit the data to be displayed on the display 50 to the remote display security module 68.

The remote display security module receives the display data (step 308). A second data integrity result is generated by performing the first data integrity operation on the display data received at the remote display security module (step 310). For example, the remote display security module 68 can receive the display data and can perform the same CRC calculation that was performed on the display data by the secure display controller 80. Additionally, if an indication of the algorithm to use was received with the display data, the algorithm may be selected from a group of available algorithms.

A determination is made that the remote display has been tampered with at the secure display controller if the first data integrity result does not match the second data integrity result (step 312). For example, if a CRC code is received by the secure display controller 80 from the remote display security module 68, the secure display controller 80 can compare the CRC code received from the remote display security module 68 with the one generated on the display data sent to the remote display security module 68. If the two codes do not match, the secure display controller 80 can determine that someone has tampered with the display 50. Further, if a code is not received from the remote display security module 68, the secure display controller 80 can also determine that someone has tampered with the display 50. In contrast, if the two codes match, the secure display controller 80 can determine that the display 50 has not been tampered with and that the control/data line interface 70, the remote display security module 68, and the display 50 are working properly.

Figure 4:
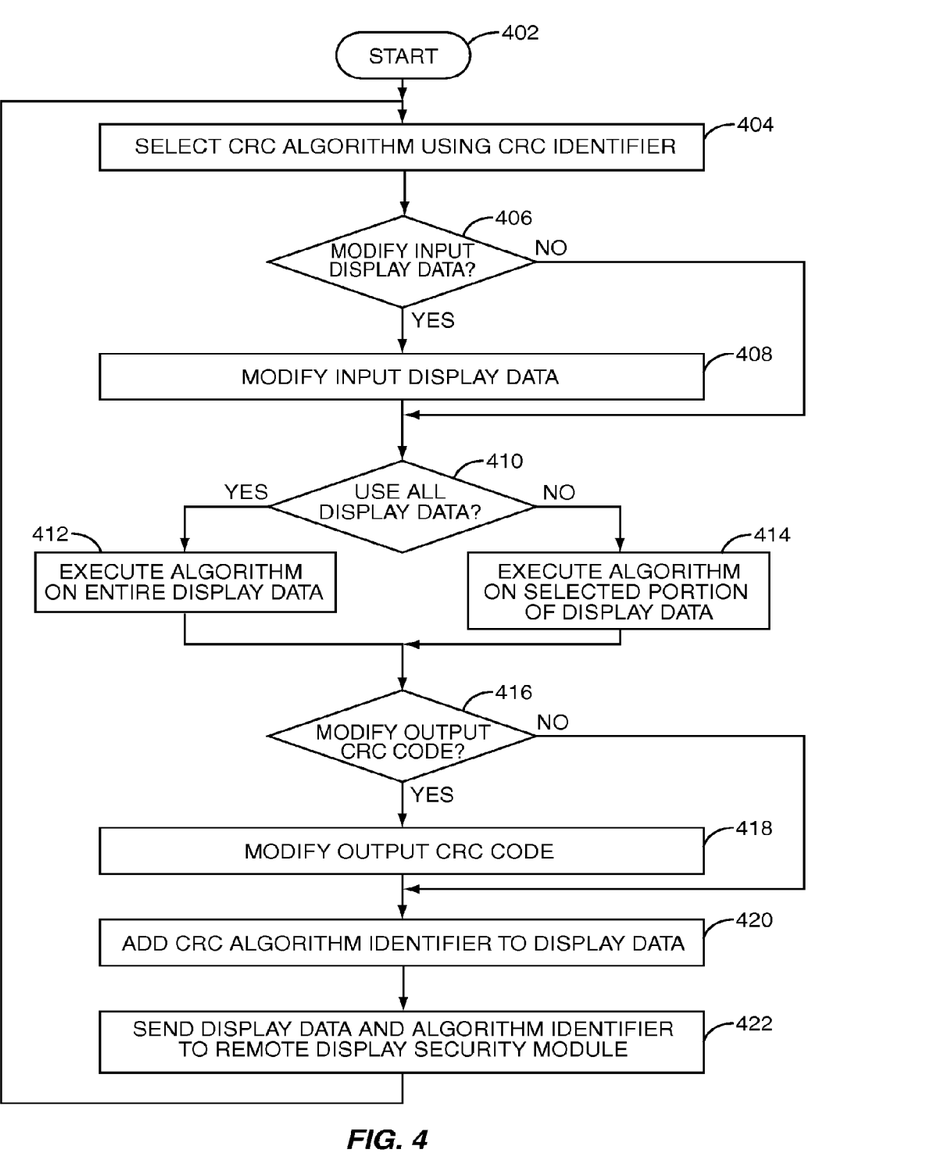
FIG. 4 is a flow chart illustrating exemplary steps for providing display data integrity for a remote-mounted display including cyclical redundancy check (CRC) algorithm selection and algorithm options related to the display data.

FIG. 4 illustrates an exemplary process for providing display data integrity for a remote-mounted display including CRC algorithm selection and algorithm options related to the display data. The process starts at step 402. A CRC algorithm is selected from a group of CRC algorithms using a CRC identifier (step 404). Based upon the selected CRC algorithm, a determination is made as to whether to modify the display data prior to executing the selected CRC algorithm on the display data (decision point 406). For example, the selected CRC algorithm may indicate that the display data is to be rotated, shifted or otherwise modified prior to executing the selected CRC algorithm on the display data. The display data is modified as indicated via the selected CRC algorithm (step 408).

Based upon the selected CRC algorithm, a determination is made as to whether all or a portion of the display data is to be used for the CRC calculation (decision point 410). For example, the selected CRC algorithm may indicate that only a portion of the display data is to be used for calculation of the CRC for the display data. Further, multiple portions of the display data may be used. These portions may be concatenated, further shifted, or otherwise modified by placement options to arrive at the data to be operated upon with the selected algorithm. In this fashion, the selected algorithm may be executed on any portion of the display data and the selected portion may be dynamically changed based upon the selected algorithm.

When a determination is made to execute the selected CRC algorithm on the entire display data, the CRC algorithm may be executed on the entire display data (step 412). When a determination is made to execute the selected CRC algorithm on a portion of the display data, the CRC algorithm may be executed on the selected portion of the display data, as described above (step 414).

Additionally, a determination may also be made based upon the selected CRC algorithm as to whether to modify the output CRC code prior to transmission of the display data to the remote display security module 68 (step 416). For example, a two's complement, shifting, or rotation of the CRC code may be done to further enhance security. When a determination is made to modify the output CRC code, this modification can be performed (step 418).

Additionally, the algorithm selection identifier is added to the display data so that it can be transmitted to the remote display security module 68 to provide for remote selection of the CRC algorithm that is associated with the data (step 420).

The display data and the algorithm selection identifier are then sent to the remote display security module 68 for display (step 422). The process then iterates by returning to step 404 to process the next display data to be transmitted.

Figure 5:
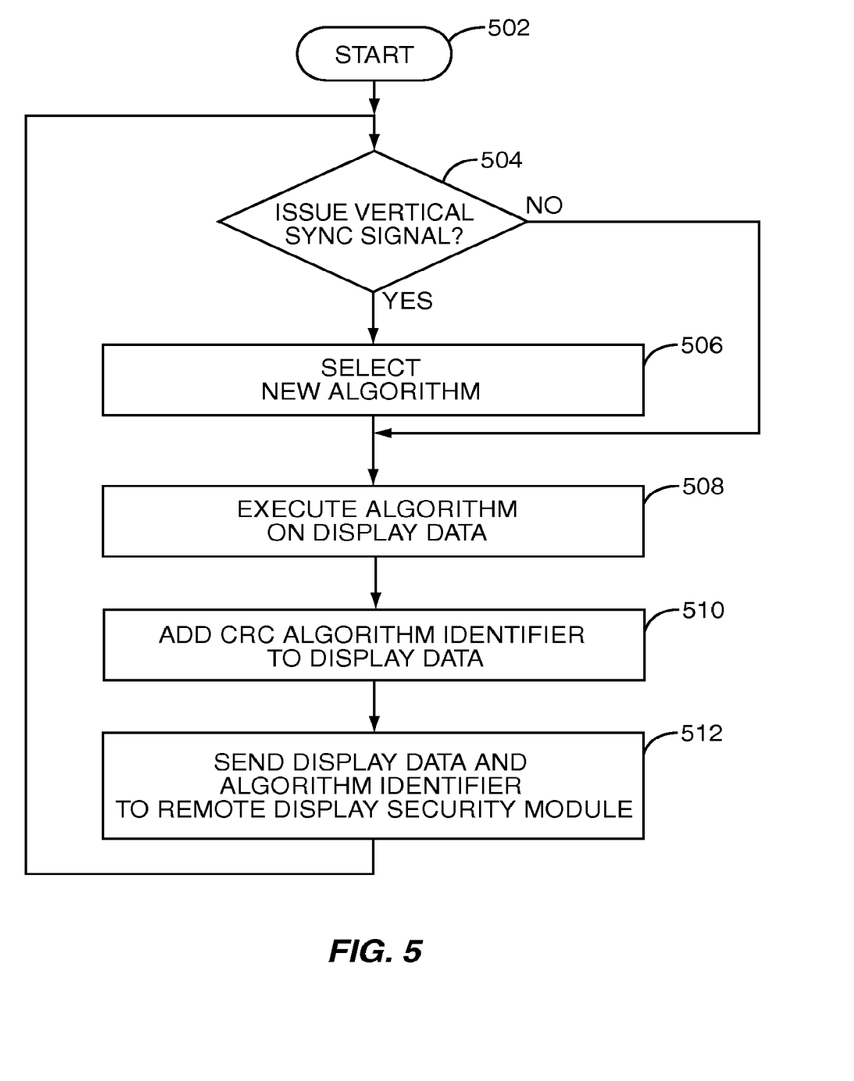
FIG. 5 is a flow chart illustrating exemplary steps for providing display data integrity for a remote-mounted display including CRC algorithm selection associated with a vertical sync control signal for the remote display.

FIG. 5 illustrates an exemplary process for providing display data integrity for a remote-mounted display including CRC algorithm selection associated with a vertical sync control signal for the remote display. Any control signal or event may be used in place of the vertical sync signal. For example, a reset signal or horizontal sync signal may also be used. The process starts at step 502.

A determination is made as to whether to issue a vertical sync signal to the remote display, such as display 50 (step 504). Upon determining that a vertical sync signal is to be generated for the remote display, a CRC algorithm is selected from a group of CRC algorithms (step 506). The CRC algorithms may be chosen randomly or may be chosen in a sequential or round robin fashion. Additionally, the CRC algorithms may be chosen by bit fields within the data stream itself. For example, if four algorithms are to be used, two bits within any portion of the display data may be used to select the algorithm. Further, the bits used to select the algorithm may be changed over time. Accordingly, as the display data changes, the algorithm selected may be changed based upon the display data.

The selected algorithm is executed on the display data (step 508). Any of the alternatives described in relation to FIG. 4 can be implemented as part of the execution of the CRC algorithm. The algorithm selection identifier is added to the display data so that it can be transmitted to the remote display security module 68 (step 510). As described above, the display data itself may be used to select the algorithm.

The display data and the algorithm selection identifier are then sent to the remote display security module 68 for verification and display (step 512). The process then iterates by returning to step 504 to process the next display data to be transmitted.

Figure 6:
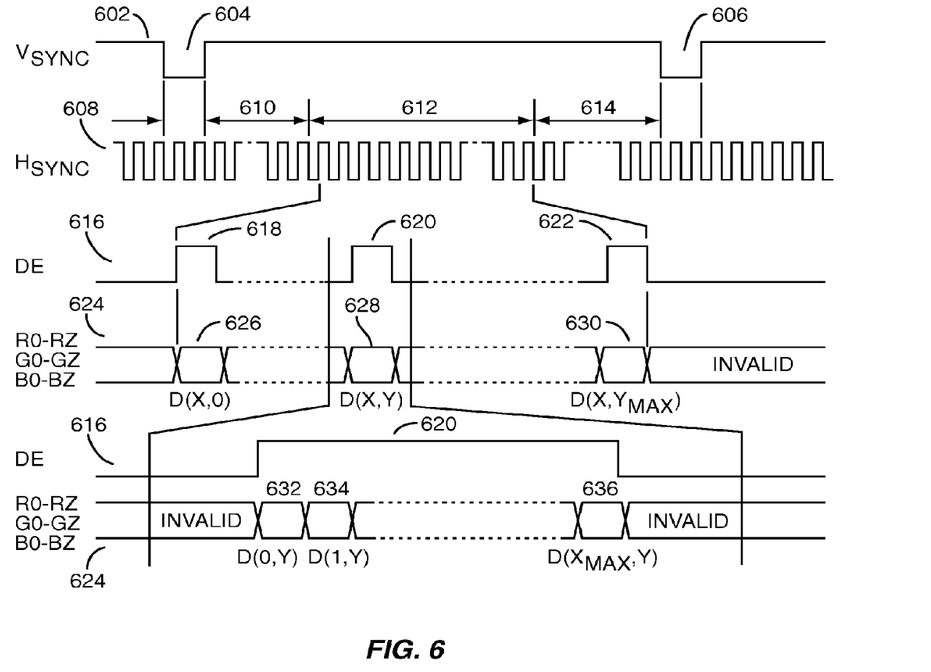
FIG. 6 illustrates an exemplary timing diagram for a generic display that may be used as the remote-mounted display of the present invention.

FIG. 6 illustrates an exemplary timing diagram for a generic display that may be used as the remote-mounted display 50 above and in FIG. 5 in particular. A vertical sync (Vsync) signal 602 is shown as an active-low signal with active regions 604 and 606. The Vsync signal is used to indicate the beginning of a display update cycle for a display, such as the display 50.

A horizontal sync (Hsync) signal 608 is used to identify regions of data associated with horizontal regions of the display 50. A pre-data period 610, a data period 612, and a post-data period 614 are illustrated. During the pre-data period 610 and the post-data period 614, no data is passed to the display 50. Accordingly, as will be described in more detail below, these regions may be used to communicate CRC algorithm selection information. Alternatively, the CRC algorithm selection may be passed within and/or selected by the display data during data period 612.

The data period 612 is expanded below the Hsync signal 608 within FIG. 6. An active-high data enable (DE) signal 616 is illustrated. During the data period 612, the DE signal 616 activates for each data set that is presented to the display 50. Exemplary DE signal pulses 618, 620 and 622 are illustrated.

A data buss 624 passes display data to the display 50 for red, green and blue color variants. The fields for red (e.g., R0-RZ), green (e.g., G0-GZ), and blue (e.g., B0-BZ) can be, for example, six (6) bits for each field yielding a data buss width for the data buss 624 of eighteen (18) bits. Other variations on buss width and color field widths for a data buss, such as data buss 624, are possible and all are considered within the scope of the subject matter described herein.

A data segment 626 passes display data for the first row of the display 50 that is to be written during the DE signal pulse 618. A data segment 628 passes display data for the row of the display 50 that is to be written during the DE signal pulse 620. A data segment 630 passes display data for the last row of the display 50 that is to be written during the DE signal pulse 622.

For purposes of illustration, it will be assumed that the top row of the display 50 is to be written first and that the bottom row is to be written last. Accordingly, data segment 626 represents data that is to be written to the top row of the display 50 and data segment 630 represents data that is to be written to the bottom row of the display 50. An independent variable "Y" is used within FIG. 6 to represent the row identifier for the respective data segment that is written to the display 50. The independent variable is shown within FIG. 6 to vary between zero (0) and "YMax." The maximum value of Y can be, for example, four hundred seventy nine (479) for a display with a resolution of 640×480 pixels, where 480 rows of pixels are present for the display of data and the first row is identified by a zero (0).

An independent variable "X" is used within FIG. 6 to identify the pixel within a row that is to be written with data. Accordingly, an identifier D(X,Y) is associated with data segment 628 that occurs during the DE signal pulse 620. Likewise, an identifier D(X,0) that is associated with the data segment 626 during the DE signal pulse 618 and an identifier $D(X, Y_{Max})$ that is associated with the data segment 630 during the DE signal pulse 622.

The DE signal pulse 620 and the data segment 628 of data buss 624 are expanded below the expanded data period 612 within FIG. 6. As can be seen from FIG. 6, data segments 632, 634, and 636 are represented. Identifiers associated with the data segments 632, 634, and 636 are D(0,Y), D(1,Y), and $D(X_{Max},Y)$, respectively. For the example of a 640×480 display, the value of X can range between zero (0) and six hundred thirty nine (639). Data can be latched during any data segment by a data clock (not shown). Accordingly, for any display write period, such as data period 612, all pixels within the display can be written by varying the values of the independent variables X and Y across the display.

As described above, the data values that are written to the display can be used to select a CRC algorithm. This algorithm selection may be performed on a pixel-by-pixel basis or may be performed for an entire display sequence, such as data period 612, by the data within a data segment, such as the first data segment (e.g., D(0,0)—not shown within FIG. 6). In this way, the CRC algorithm selection can be performed at the beginning of a display sequence, such as data period 612, and can be used during the entire display update sequence. Alternatively, the CRC algorithm selection can be performed at the end of a display sequence or during any intermediate data segment and can be effective until changed. Because the DE signal 616 is active during display data write periods, the DE signal 616 may be used to gate the display data during the CRC algorithm selection period. Further, pulses of the DE signal 616, such as the DE signal pulse 618, may be counted to adjust which display data segment will be used to identify the CRC algorithm. The change in the CRC algorithm can be randomized or varied over time to further enhance security.

Alternatively, the CRC algorithm selection can be performed during time periods that are not associated with active display data transmission, such as during the pre-data period 610 and the post-data period 614. The CRC algorithm selection may be based upon the display data. For example, a register may be used to capture a certain portion of the display data and this data may be multiplexed onto the data buss 624 during a third Hsync pulse after a rising edge of the Vsync signal. Other locations for communication of the CRC algorithm selection are possible. Further, the portion of the display data captured and multiplexed onto the data buss 624 may be randomized and otherwise varied over time.

As yet another alternative, the CRC algorithm selection can be performed independently of the display data during these time periods that are not associated with active display data transmission. Equation-based manipulations may be used to select a CRC algorithm. For example, a modulus operation may be performed on a fixed width bit field within a register on each subsequent display data update. The result of the modulus operation may be used to select the CRC algorithm from a set of CRC algorithms. The CRC algorithm identifier may then be transmitted during these time periods that are not associated with active display data transmission.

Again, any number of bits may be used to select the CRC algorithm and the algorithm selection may further be performed over multiple data values to further expand the number of possible CRC algorithm permutations that may be used. Accordingly, the equation used or the bit field width may be changed over time.

Figure 7:
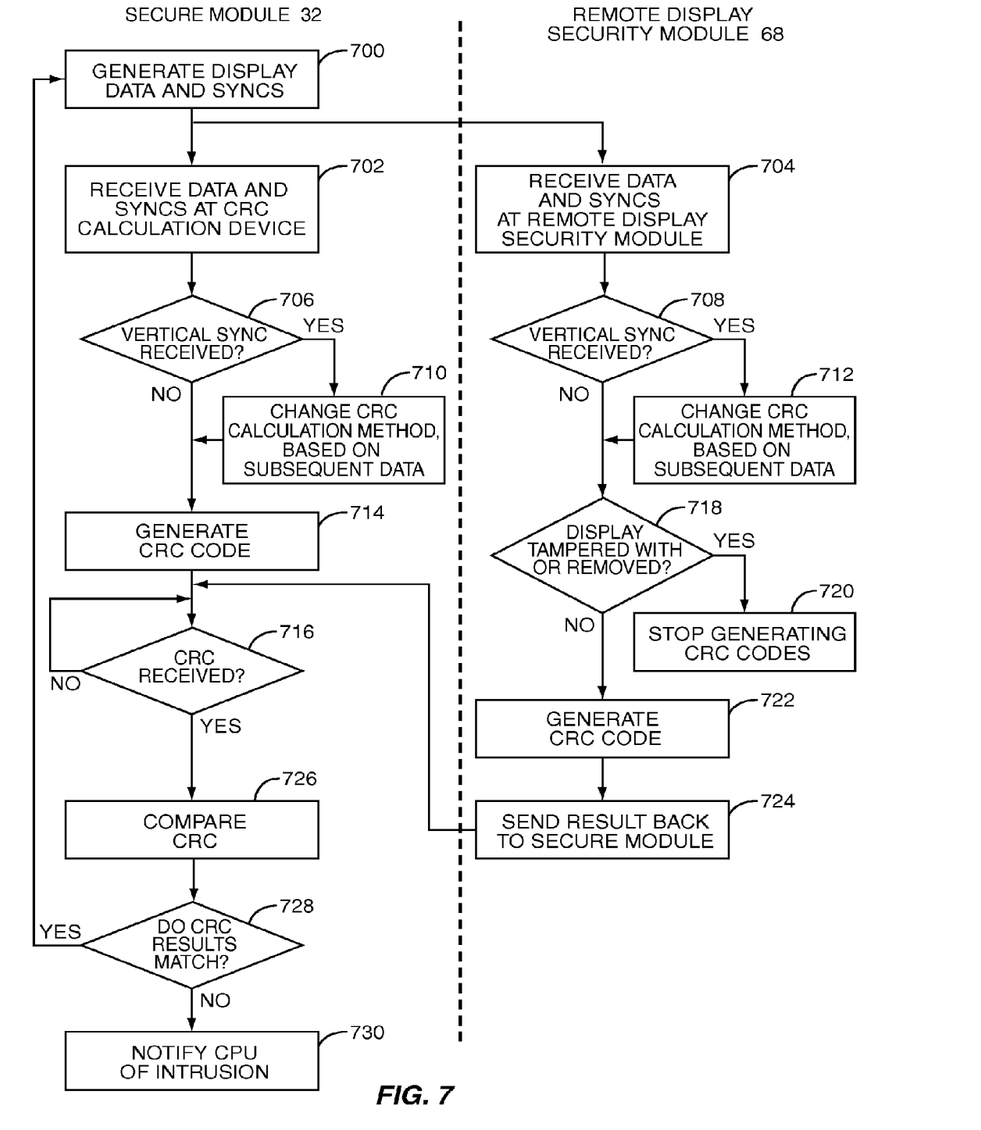
FIG. 7 illustrates exemplary steps for communicating a CRC algorithm selection between a secure module and a remote display security module and for detecting tampering with or removal of a display based upon use of the generic timing diagram of FIG. 6.

FIG. 7 illustrates an exemplary process for communication of a CRC algorithm selection between the secure module 32 and the remote display security module 68 and for detecting tampering with or removal of a display based upon use of the generic timing diagram of FIG. 6. FIG. 7 illustrates two sub-processes that work together. The left portion of FIG. 7 represents processing that takes place on the display data transmit side, such as at the secure module 32. The right portion of FIG. 7 represents processing that takes place on the display data receive side, such as at the remote display security module 68. The control/data line interface 70 may be used to communicate between the secure module 32 and the remote display security module 68.

Display data and sync signals are generated (step 700). The display data and sync signals are received at the transmit data integrity module 84 within the secure module 32 and at the remote data integrity module 88 within the remote display security module 68 (steps 702 and 704, respectively). A determination is made as to whether a Vsync signal has been received at the transmit data integrity module 84 and at the remote data integrity module 88 (steps 706 and 708, respectively). If a vertical sync was received at the two modules, a CRC algorithm may be changed (steps 710 and 712, respectively) based upon the subsequent display data that is received. Alternatively, the CRC algorithm may remain the same and can be changed by any other relationship of display interface signals described above. A CRC code is generated for the transmitted data (step 714) and the process waits for a CRC result to be received (step 716).

A determination is made as to whether the display has been tampered with or removed (step 718). If a determination is made that the display has been tampered with or removed, the process stops generating CRC codes at the remote display security module 68 (step 720). By ceasing generation of the CRC codes at the remote display security module 68, the secure module 32 will be able to determine that the display 50 has been tampered with or removed. If a determination is made that the display has not been tampered with or removed, the process generates a CRC code at the remote display security module 68 (step 722). The process then sends the result back to the secure module 32 (step 724).

Receipt of a CRC code at the secure module 32 (step 716) allows the process to compare the received CRC code with the transmitted CRC code (step 726). A determination is then made as to whether the CRC results match (step 728). If the two results do not match, the CPU is notified of an intrusion (step 730). It should also be noted that the process described can also detect other problems, such as a problem with the integrity of the control/data line interface 70. If the two results match, the process returns to generate display data and syncs for the next display update sequence (step 700).

Those skilled in the art will recognize improvements and modifications to the preferred embodiments of the present invention. All such improvements and modifications are considered within the scope of the concepts disclosed herein and the claims that follow.

What is claimed is:

1. A method for detecting tampering of a remote display having an associated remote display security module, comprising:
generating at a secure module a first data integrity result by performing a first data integrity operation on display data that instructs the remote display what to display;
transmitting the display data from the secure module to the remote display security module;
receiving at the remote display security module the display data;
generating a second data integrity result at the remote display security module by performing the first data integrity operation on the received display data;
transmitting the second data integrity result to the secure module; and
determining at the secure module whether the remote display has been tampered with based at least in part on determining whether the first data integrity result matches the second data integrity result.

2. The method of claim 1 wherein the step of determining whether the first data integrity result matches the second data integrity result comprises determining whether the second data integrity result is received at the secure module.

3. The method of claim 1 further comprising displaying the display data on the remote display.

4. The method of claim 3 wherein the step of displaying the display data is performed at the remote display security module.

5. The method of claim 1 further comprising monitoring a tamper detection switch at the remote display security module.

6. The method of claim 5 comprising determining that the remote display has been tampered with at the remote display security module by sensing a signal from the tamper detection switch indicating that the remote display has been tampered with.

7. The method of claim 6 wherein the remote display security module senses the signal from the tamper detection switch indicating that the remote display has been tampered with in association with a boot sequence for the remote display security module after at least one of a reset and a power-down condition at the remote display security module.

8. The method of claim 5 wherein the tamper detection switch is selected from a group consisting of a plunger switch and a proximity switch.

9. The method of claim 1 wherein the first data integrity operation includes calculating a cyclical redundancy check (CRC) on the display data.

10. The method of claim 9 wherein the CRC is calculated on a fixed portion of the display data.

11. The method of claim 9 wherein the CRC is calculated on a varying portion of the display data.

12. The method of claim 9 wherein the CRC is calculated by delaying at least one bit of the display data.

13. The method of claim 1 wherein the first data integrity operation is selected from a plurality of data integrity operations.

14. The method of claim 1 wherein the first data integrity operation is selected in association with a control signal asserted to the remote display.

15. The method of claim 1 further comprising sending an indication identifying the first data integrity operation within a plurality of data integrity operations to the remote display security module.

16. The method of claim 15 wherein the indication identifying the first data integrity operation is sent to the remote display security module at a time other than when the display data is sent to the remote display security module.

17. The method of claim 1 wherein at least a portion of the display data is used to select the first data integrity operation within a plurality of data integrity operations.

18. A system for detecting tampering of a remote display having an associated remote display security module, comprising:
    a secure module adapted to:
        generate a first data integrity result by performing a first data integrity operation on display data to be displayed on the remote display;
        transmit the display data to the remote display security module;
        determine whether the remote display has been tampered with based at least in part on determining whether the first data integrity result matches a second data integrity result; and
    a remote display security module adapted to:
        receive the display data;
        generate the second data integrity result by performing the first data integrity operation on the display data received at the remote display security module; and
        transmit the second data integrity result to the secure module.

19. The system of claim 18 wherein the secure module is further adapted to determine whether the first data integrity result matches the second data integrity result based on whether the second data integrity result is received.

20. The system of claim 18 wherein the remote display security module is further adapted to display the display data on the remote display.

21. The system of claim 18 wherein the remote display security module is further adapted to monitor a tamper detection switch, wherein the remote display security module is further adapted to determine that the remote display has been tampered with by sensing a signal from the tamper detection switch indicating that the remote display has been tampered with.

22. The system of claim 21 wherein the remote display security module is further adapted to sense the signal from the tamper detection switch indicating that the remote display has been tampered with in association with a boot sequence for the remote display security module after at least one of a reset and a power down condition at the remote display security module.

23. The system of claim 18 wherein the secure module and the remote display security module are adapted to perform the first data integrity operation by calculating a cyclical redundancy check (CRC) on the display data.

* * * * *